(12) United States Patent
Kojima et al.

(10) Patent No.: US 12,692,579 B2
(45) Date of Patent: Jul. 28, 2026

(54) SINTERED BODY AND CUTTING TOOL

(71) Applicant: NTK CUTTING TOOLS CO., LTD., Komaki (JP)

(72) Inventors: Yoshito Kojima, Nagoya (JP); Kentaro Yamamoto, Nagoya (JP); Ryoji Toyoda, Nagoya (JP)

(73) Assignee: NTK CUTTING TOOLS CO., LTD., Komaki (JP)

( * ) Notice: Subject to any disclaimer, the term of this patent is extended or adjusted under 35 U.S.C. 154(b) by 647 days.

(21) Appl. No.: 18/025,342

(22) PCT Filed: Sep. 13, 2021

(86) PCT No.: PCT/JP2021/033445
§ 371 (c)(1),
(2) Date: Mar. 8, 2023

(87) PCT Pub. No.: WO2022/113477
PCT Pub. Date: Jun. 2, 2022

(65) Prior Publication Data
US 2024/0026501 A1      Jan. 25, 2024

(30) Foreign Application Priority Data

Nov. 27, 2020    (JP) ................................. 2020-196844

(51) Int. Cl.
C22C 29/04       (2006.01)
B23B 27/14       (2006.01)
C22C 29/00       (2006.01)
(52) U.S. Cl.
CPC .............. C22C 29/04 (2013.01); B23B 27/14 (2013.01); C22C 29/005 (2013.01)

(58) Field of Classification Search
CPC ......... C22C 29/04; C22C 29/005; C22C 1/05; C22C 29/16; B23B 27/14; B22F 2005/001
See application file for complete search history.

(56) References Cited

U.S. PATENT DOCUMENTS 5,976,707 A * 11/1999 Grab ..................... C23C 30/005
                                                                    75/238
7,762,747 B2    7/2010 Taniuchi et al.
                    (Continued)

FOREIGN PATENT DOCUMENTS

EP          1892051 A1 *  2/2008 ............. C22C 29/02
EP      2 154 259 A1      2/2010
                    (Continued)

OTHER PUBLICATIONS

JPWO2008146856A1 machine translation (Year: 2010).*
International Search Report for PCT/JP2021/033445 dated, Nov. 30, 2021 (PCT/ISA/210).

*Primary Examiner* — Cameron K Miller
(74) *Attorney, Agent, or Firm* — Sughrue Mion, PLLC

(57) ABSTRACT

A sintered body and cutting tool, the sintered body (2) including: a first hard particle (10) containing TiCN; a second hard particle (20) containing (Ti, M) (C, N); a third hard particle (30) including a core portion (31) containing TiCN, and a peripheral portion (32) enclosing the core portion (31) and containing (Ti, M) (C, N) each as main components; a particle (40) containing at least one of Al, Zr, and Si; and a binding phase (50) containing at least one of Co and Ni and at least one of Re and Ru, and has a thickness of not greater than 5 nm. The third hard particle (30) has, in the core portion (31), a particle (33) containing at least one selected from Co, Ni, Re, and Ru, and has a dislocation (34) in each of the core portion (31) and the peripheral portion (32).

6 Claims, 9 Drawing Sheets

(56) References Cited

U.S. PATENT DOCUMENTS

| | | | |
|---|---|---|---|
| 8,007,561 B2 | 8/2011 | Shindo et al. | |
| 10,987,739 B2 | 4/2021 | Yamamoto et al. | |
| 2002/0094296 A1* | 7/2002 | Enya ........................ | C22C 1/051 |
| | | | 75/235 |
| 2009/0049953 A1* | 2/2009 | Shindo .................... | C22C 27/04 |
| | | | 75/238 |
| 2010/0014930 A1 | 1/2010 | Taniuchi et al. | |
| 2010/0089203 A1 | 4/2010 | Kinoshita et al. | |
| 2018/0169766 A1 | 6/2018 | Yamamoto et al. | |
| 2020/0078868 A1* | 3/2020 | Hirano .................... | C23C 28/04 |
| 2021/0017632 A1* | 1/2021 | Ito ........................ | C23C 16/403 |

FOREIGN PATENT DOCUMENTS

| | | | | | |
|---|---|---|---|---|---|
| JP | 5-117020 | A | 5/1993 | | |
| JP | 8-257810 | A | 10/1996 | | |
| JP | 2001-114562 | A | 4/2001 | | |
| JP | 2007-136656 | A | 6/2007 | | |
| JP | 2007-262504 | A | 10/2007 | | |
| JP | 2010-517792 | A | 5/2010 | | |
| JP | WO2008146856 | * | 8/2010 | .............. | C22C 1/05 |
| JP | 2014-221942 | A | 11/2014 | | |
| JP | 2016-20541 | A | 2/2016 | | |
| JP | 2017-35750 | A | 2/2017 | | |
| JP | 2018-65228 | A | 4/2018 | | |
| WO | 2008/146856 | A1 | 12/2008 | | |

* cited by examiner

SINTERED BODY AND CUTTING TOOL

CROSS REFERENCE TO RELATED APPLICATIONS

This application is a National Stage of International Application No. PCT/JP2021/033445 filed Sep. 13, 2021, claiming priority based on Japanese Patent Application No. 2020-196844 filed Nov. 27, 2020.

TECHNICAL FIELD

The present disclosure relates to a sintered body and a cutting tool.

BACKGROUND ART

A cutting tool in which cermet or cemented carbide that includes a hard phase containing tungsten carbide or titanium carbonitride as a main component, and a binding phase containing an iron group element as a main component is used as a base material, has been known (for example, see Patent Documents 1, 2).

Furthermore, a cutting tool in which a ceramics sintered body containing alumina as a main component is used as a base material, has also been known (for example, see Patent Document 3).

PRIOR ART DOCUMENT

Patent Document

Patent Document 1: Japanese Patent Application Laid-Open (kokai) No. 2016-020541

Patent Document 2: International Publication No. WO2008/146856

Patent Document 3: Japanese Patent Application Laid-Open (kokai) No. H05-117020

SUMMARY OF THE INVENTION

Problem to be Solved by the Invention

A cutting tool in which cemented carbide or cermet is used as a base material generally has excellent fracture resistance, but has low heat-resistance and is not considered to be proper for high-speed machining. For reference, in Patent Document 1, the cutting tool is used at a cutting speed Vc=180 to 350 m/min. In Patent Document 2, the cutting tool is used at a cutting speed Vc=150 to 250 m/min.

A cutting tool in which a ceramics sintered body is used as a base material generally has low fracture resistance. Therefore, it is difficult to consider that the cutting tool is proactively used for a workpiece having high cutting resistance (for example, steel material).

Meanwhile, in recent years, a technique for high-speed machining (for example, Vc=500 m/min) of a steel material having high cutting resistance, has been required.

The present disclosure has been made in view of the aforementioned circumstances, and an object of the present disclosure is to provide a sintered body and a cutting tool that have excellent wear resistance and fracture resistance in high-speed machining. The present disclosure can be implemented so as to provide the following aspects.

Means for Solving the Problem

[1] A sintered body including:

a first hard particle containing TiCN as a main component;

a second hard particle containing, as a main component, (Ti, M) (C, N) (M represents one or more elements selected from group 4 to group 6 elements (excluding Ti element) in a periodic table);

a third hard particle including a core portion containing TiCN as a main component, and a peripheral portion enclosing the core portion and containing, as a main component, (Ti, M) (C, N) (M represents one or more elements selected from group 4 to group 6 elements (excluding Ti element) in the periodic table);

a particle containing at least one of Al, Zr, and Si; and a binding phase containing at least one of Co and Ni, wherein the binding phase further contains at least one of Re and Ru, and has a thickness of not greater than 5 nm at at least a part of a grain boundary between the third hard particles adjacent to each other, and at least one of the third hard particles has, in the core portion, a particle containing at least one selected from Co, Ni, Re, and Ru, and has at least one dislocation in each of the core portion and the peripheral portion.

[2] The sintered body according to [1], in which the binding phase further contains Mo.

[3] The sintered body according to [1] or [2], in which the particle containing at least one of Al, Zr, and Si contains AlN as a main component.

[4] A cutting tool comprising the sintered body according to any one of [1] to [3].

[5] The cutting tool according to [4], including a coating layer on a surface.

Advantageous Effects of the Invention

According to the present disclosure, the sintered body having excellent wear resistance and fracture resistance in high-speed machining, can be provided.

In a case where the binding phase further contains Mo, high-temperature softening of the binding phase can be inhibited. Therefore, plastic deformation of the sintered body is less likely to occur. Furthermore, a part of Mo is dissolved in the second hard particles and the third hard particles as a solid solution, and enhances binding strength between the binding phase and the hard particles. Therefore, wear resistance and fracture resistance can be further improved.

In a case where the particle containing at least one of Al, Zr, and Si contains AlN as a main component, thermal conductivity can be enhanced, and, furthermore, a thermal expansion coefficient can be reduced. As a result, wear resistance and fracture resistance can be further improved in high-speed machining.

By using the sintered body of the present disclosure for a cutting tool, the cutting tool having excellent wear resistance and fracture resistance can be provided.

In a case where the coating layer is formed on a surface of the cutting tool, the surface can be hardened, and oxidation of a base covered by the coating layer can be inhibited. Therefore, wear resistance of the cutting tool can be further improved.

MODES FOR CARRYING OUT THE INVENTION

Figure 1:
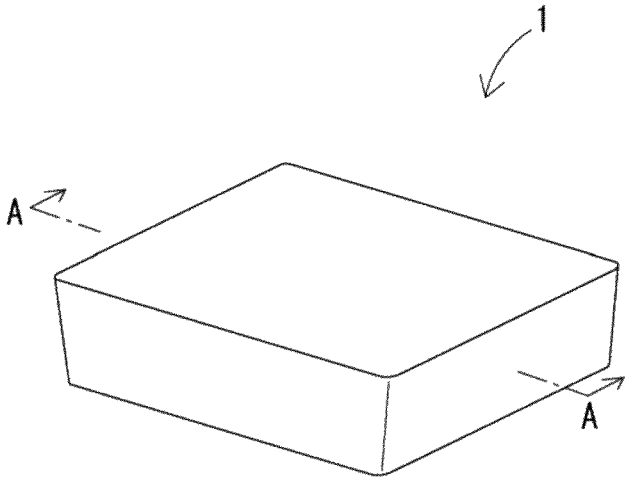
FIG. 1 Perspective view of an example of a sintered body (cutting tool).

The present disclosure will be described below in detail. In the description herein, when "to" is used to describe a numerical value range, the lower limit value and the upper limit value are included unless otherwise specified. For example, when "10 to 20" is described, "10" as the lower limit value and "20" as the upper limit value are both included. That is, "10 to 20" is equivalent to "not less than 10 and not greater than 20".

1. Sintered Body (1) Structure of Sintered Body

A sintered body 2 includes: first hard particles 10 containing TiCN as a main component; second hard particles 20 containing, as a main component, (Ti, M) (C, N) (M represents one or more elements selected from group 4 to group 6 elements (excluding Ti element) in the periodic table); third hard particles 30 each including a core portion 31 containing TiCN as a main component, and a peripheral portion 32 which encloses the core portion 31 and contains, as a main component, (Ti, M) (C, N) (M represents one or more elements selected from group 4 to group 6 elements (excluding Ti element) in the periodic table); particles 40 each containing at least one of Al, Zr, and Si; and a binding phase 50 containing at least one of Co and Ni. The binding phase 50 further contains at least one of Re and Ru, and has a thickness of not greater than 5 nm at at least a part of a grain boundary between the third hard particles 30 adjacent to each other. At least one of the third hard particles 30 has, in the core portion 31, a particle containing at least one selected from Co, Ni, Re, and Ru, and has at least one dislocation 34 in each of the core portion 31 and the peripheral portion 32.

(2) First Hard Particle

The first hard particle 10 contains TiCN (titanium carbonitride) as a main component. In the description herein, the "main component" means that a content of TiCN is not less than 60 volume % in a case where a content of the first hard particle 10 is 100 volume %.

The content (volume %) of each substance in the sintered body 2 can be calculated by obtaining an amount of each element by X-ray fluorescence analysis or the like.

(3) Second Hard Particle

The second hard particle 20 contains, as a main component, (Ti, M) (C, N) (M represents one or more elements selected from group 4 to group 6 elements (excluding Ti element) in the periodic table). In the description herein, the "main component" means that a content of the above-described Ti compound is not less than 60 volume % in a case where a content of the second hard particle 20 is 100 volume %. M is preferably at least one element selected from Ta (tantalum), Nb (niobium), W (tungsten), V (vanadium), Cr (chromium), Zr (zirconium), Mo (molybdenum), and Hf (hafnium). Among them, at least one element selected from Ta (tantalum), Nb (niobium), and W (tungsten) is more preferable, and Ta and/or Nb is even more preferable.

The number of kinds of the second hard particles 20 may be one or plural. That the number of kinds thereof is plural means that (Ti, M) (C, N) particles having different elements M coexist, and also means that (Ti, M) (C, N) particles having the same element M coexist so as to have different composition ratios among Ti, M, C, and N of the particles.

As a composition ratio XC of carbon and a composition ratio XN of nitrogen, a ratio represented by (XN/(XC+XN)) is preferably in a range of 0.10 to 0.90, more preferably in a range of 0.20 to 0.80, and even more preferably in a range of 0.30 to 0.70, from the viewpoint of resistance to reaction with iron contained in a workpiece.

As a composition ratio XTi of titanium and a composition ratio XM of the metal element M, a ratio represented by (XTi/(XTi+XM)) is preferably in a range of 0.40 to 0.95, more preferably in a range of 0.50 to 0.95, and even more preferably in a range of 0.70 to 0.95, from the viewpoint of hardness.

(4) Third Hard Particle

The third hard particle 30 includes the core portion 31 and the peripheral portion 32 enclosing the core portion 31.

The core portion 31 contains TiCN as a main component. That is, the core portion 31 is formed of the same component as that of the first hard particle 10. The same description between the component of the core portion 31 and the component of the first hard particle 10 is omitted.

The peripheral portion 32 contains, as a main component, (Ti, M) (C, N) (M represents one or more elements selected from group 4 to group 6 elements (excluding Ti element) in the periodic table). That is, the peripheral portion 32 is formed of the same component as that of the second hard particle 20. The same description between the component of the peripheral portion 32 and the component of the second hard particle 20 is omitted.

(5) Contents of First Hard Particles, Second Hard Particles, and Third Hard Particles The content of each of the hard particles 10, 20, and is not particularly limited. However, the content of the third hard particles 30 is preferably not less than 10 area % in a case where the area occupied by the hard particles 10, 20, and 30 is 100 area %. Furthermore, the content of the third hard particles 30 having, in the core portion 31, a particle containing at least one selected from Co, Ni, Re, and Ru, and having at least one dislocation 34 in each of the core portion 31 and the peripheral portion 32, is preferably not less than 5 area % with respect to 100 area % of the area occupied by the hard particles 10, 20, and 30. In a case where the content (area %) of the third hard particles 30 is in the above-described range, a tool in which the sintered body 2 is used can have improved wear resistance and fracture resistance.

The content (area %) of the third hard particles 30 can be confirmed by observing an STEM image of the sintered body 2 which is obtained by an STEM (scanning transmission electron microscope). This observation is performed in a 15 μm square range on the cross-section of the sintered body 2. The area occupied by each of the first hard particles 10, the second hard particles 20, and the third hard particles 30 which are observed is measured, whereby the content (area %) of the third hard particles 30 can be calculated.

The content of each of the hard particles 10, 20, and 30 can be adjusted by changing a composition of blended materials of the sintered body 2 and a sintering condition.

(6) Particles (Dispersed Particles) Containing at Least One of Al, Zr, and Si

The particles 40 containing at least one of Al (aluminium), Zr (zirconium), and Si (silicon) exist in the sintered body 2 in a dispersed state to inhibit particle growth of the first hard particles 10, the second hard particles 20, the third hard particles 30, and the like. Hereinafter, the particles 40 containing at least one of Al, Zr, and Si are also referred to as the dispersed particles 40.

Examples of the dispersed particles 40 include particles formed of one or more of nitrides, oxides, carbides, and oxynitrides of each of Al, Zr, and Si. For example, the dispersed particles 40 are formed of one or more of AlN particles (aluminium nitride particles), $Al_2O_3$ particles (aluminium oxide particles), AlON particles (aluminium oxynitride particles), $ZrO_2$ particles (zirconium oxide particles), SiC particles (silicon carbide particles), and $Si_3N_4$ particles (silicon nitride particles).

The content of the dispersed particles 40 is not particularly limited. The content of the dispersed particles 40 is preferably 3 to 20 volume % and more preferably 5 to 15 volume % in a case where the content of the entirety of the sintered body 2 is 100 volume %. In a case where the content of the dispersed particles 40 is not less than the lower limit in the above-described range, particle growth of the hard particles 10, 20, and 30 can be effectively inhibited. In a case where the content of the dispersed particles 40 is not greater than the upper limit in the above-described range, the structure of the sintered body 2 can be easily densified, hardness is assured, and wear resistance can be improved.

(7) Binding Phase

The binding phase 50 contains at least one of Co (cobalt) and Ni (nickel).

Figure 7:
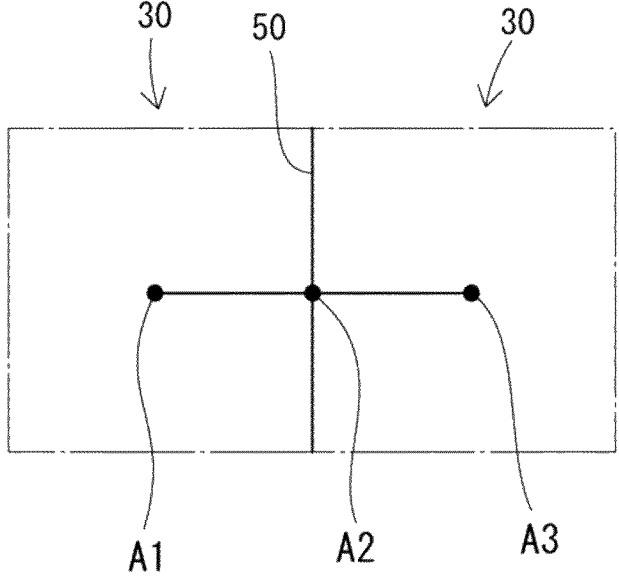
FIG. 7 Diagram schematically illustrating a grain boundary between third hard particles adjacent to each other.
Figure 8:
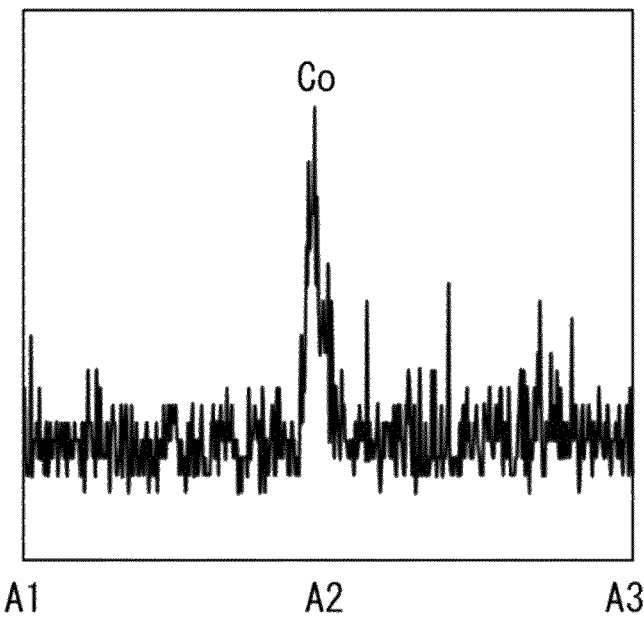
FIG. 8 Graph obtained by measuring, by an EDS, a concentration of cobalt element near a grain boundary between the third hard particles adjacent to each other.

For example, FIG. 8 shows a graph obtained by measuring the concentration of cobalt element near the binding phase 50 between the third hard particles 30 and 30 adjacent to each other by an EDS (energy dispersive X-ray spectrometer). In the graph in FIG. 8, the horizontal axis represents positions from a position A1 in one of the third hard particles 30 through a position A2 on the binding phase 50 to a position A3 in the other of the third hard particles 30 as positions on a straight line extending across the binding phase 50 in FIG. 7. In the graph in FIG. 8, the vertical axis represents the concentration of cobalt element. The graph indicates that cobalt is distributed in the binding phase 50 between the third hard particles 30 and 30 adjacent to each other.

Thus, the binding phase 50 contains at least one of Co and Ni, whereby binding among the hard particles 10, 20, and 30, and the dispersed particles 40 can be strengthened. Therefore, the sintered body 2 can have improved wear resistance and fracture resistance.

The total of contents of Co (cobalt) and Ni (nickel) in the binding phase 50 is preferably 40 mass % to 90 mass % and more preferably 50 mass % to 70 mass % in a case where the content of the entirety of the binding phase 50 is 100 mass %. Such a structure allows binding among the particles to be further strengthened. Therefore, the sintered body 2 can have further improved wear resistance and fracture resistance.

(8) Requirements for Binding Phase

The binding phase 50 contains at least one of Re (rhenium) and Ru (ruthenium).

Figure 9:
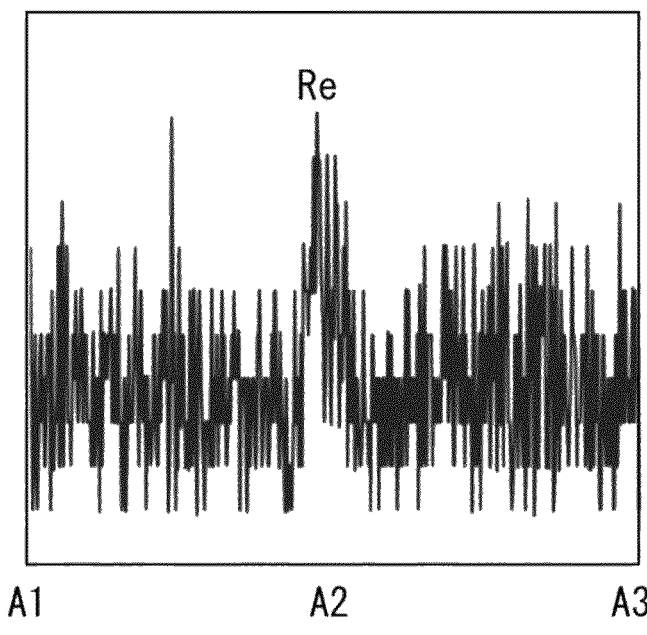
FIG. 9 Graph obtained by measuring, by an EDS, a concentration of rhenium element near a grain boundary between the third hard particles adjacent to each other.

For example, FIG. 9 shows a graph obtained by measuring the concentration of rhenium element near the binding phase 50 between the third hard particles 30 and 30 adjacent to each other by an EDS. In the graph in FIG. 9, the horizontal axis represents positions from a position A1 in one of the third hard particles 30 through a position A2 on the binding phase 50 to a position A3 in the other of the third hard particles 30 as positions on a straight line extending across the binding phase 50 in FIG. 7. In the graph in FIG. 9, the vertical axis represents the concentration of rhenium element. The graph indicates that rhenium is distributed in the binding phase 50 between the third hard particles 30 and adjacent to each other.

Re and Ru are each a metal having a high melting point. In a case where the binding phase 50 contains at least one of Re and Ru, high-temperature softening of the binding phase 50 can be inhibited. Therefore, plastic deformation of the sintered body 2 is less likely to occur. The total of contents of Re and Ru in the binding phase 50 is preferably 5 mass % to 50 mass % and more preferably 10 mass % to 25 mass % in a case where the content of the entirety of the binding phase 50 is 100 mass %.

The thickness of the binding phase 50 is not greater than 5 nm at at least a part of a grain boundary between the third hard particles 30 adjacent to each other. In a case where the thickness of the binding phase 50 is not greater than the above-described upper limit, high-temperature softening in high-speed cutting is inhibited, so that plastic deformation of the sintered body 2 is less likely to occur. Although the thickness of the binding phase 50 is not less than 1 nm in general, the thickness may have a value closer to "0".

Figure 6:
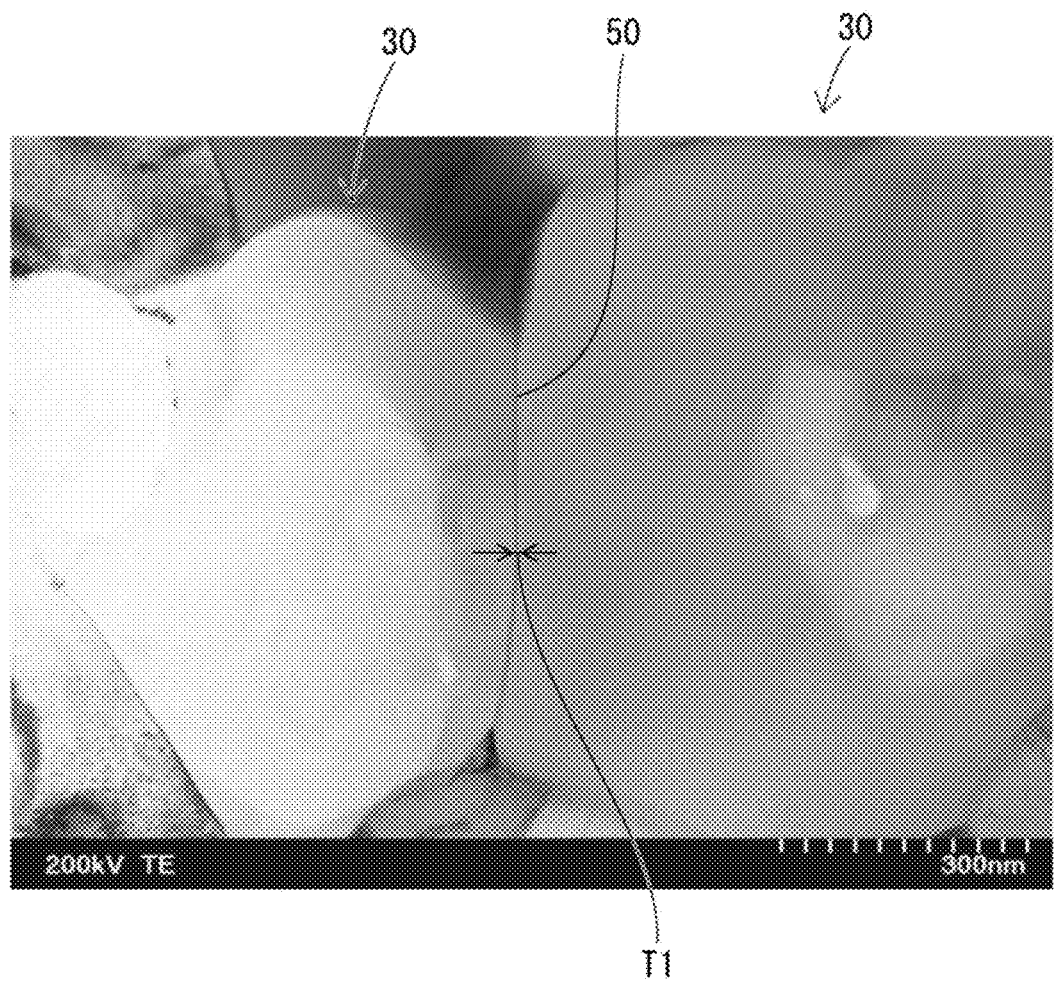
FIG. 6 Diagram illustrating an STEM image of the sintered body.

The thickness of the binding phase 50 can be determined by observing an STEM image and measuring a thickness T1 of a portion at which the thickness of the binding phase 50 is smallest at a grain boundary between the third hard particles 30 adjacent to each other (see FIG. 6).

(9) Requirements for Third Hard Particles

At least one of the third hard particles 30 has, in the core portion 31, a particle (hereinafter, also referred to as internal particle 33) that contains at least one selected from Co, Ni, Re, and Ru, and has at least one dislocation 34 in each of the core portion 31 and the peripheral portion 32. In the present disclosure, the dislocation 34 represents linear lattice defect due to displacement of a crystal plane.

At least one kind of the components contained in the internal particle 33 is the same as a component contained in the binding phase 50. The internal particle 33 has a greater thermal expansion coefficient than the core portion 31 containing TiCN as a main component. The core portion 31 containing TiCN as a main component has a greater thermal expansion coefficient than the peripheral portion 32 which contains, as a main component, (Ti, M) (C, N) (M represents one or more elements selected from group 4 to group 6 elements (excluding Ti element) in the periodic table). That is, the third hard particle 30 having the internal particle 33 is structured such that the core portion 31 has a greater thermal expansion coefficient than the peripheral portion 32, and the internal particle 33 has a greater thermal expansion coefficient than the core portion 31.

The dislocation 34 in the core portion 31 may be disposed around the internal particle 33 contained in the core portion 31. A plurality of the dislocations 34 in the core portion 31 may extend radially from around the internal particle 33 contained in the core portion 31.

The dislocation 34 in the peripheral portion 32 may be disposed around the core portion 31. A plurality of the dislocations 34 in the peripheral portion 32 may extend radially from around the core portion 31.

The number of the dislocations 34, the positions thereof, and the shapes thereof can be specified by observing an STEM image described below.

Figure 3:
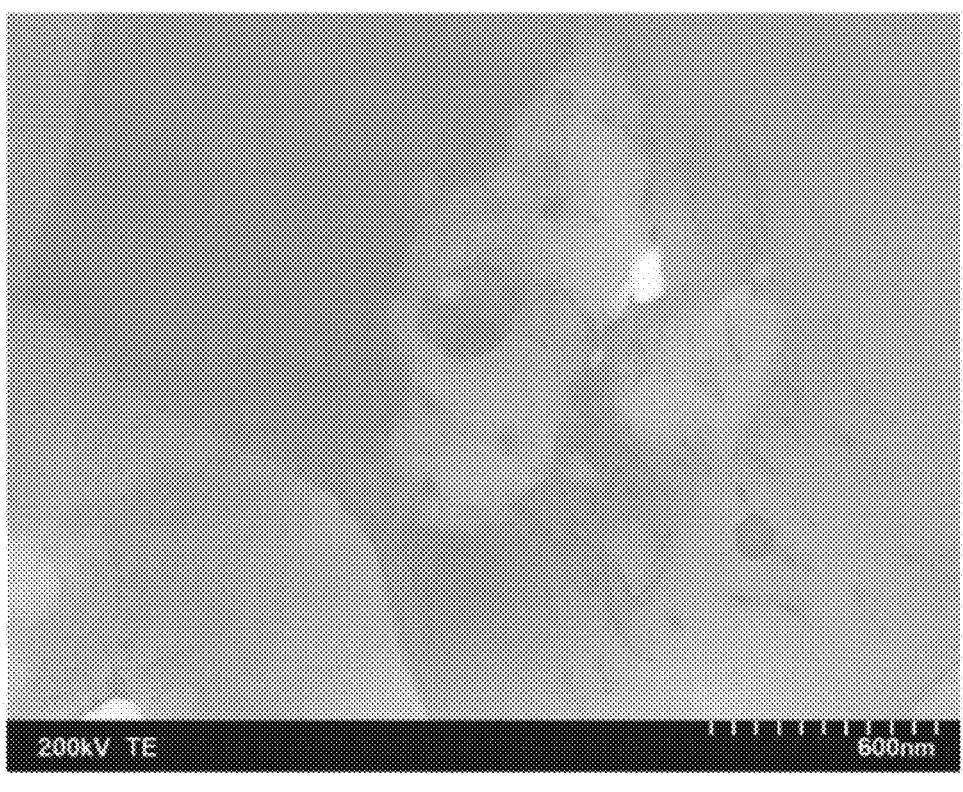
FIG. 3 Diagram illustrating an STEM image of the sintered body.
Figure 4:
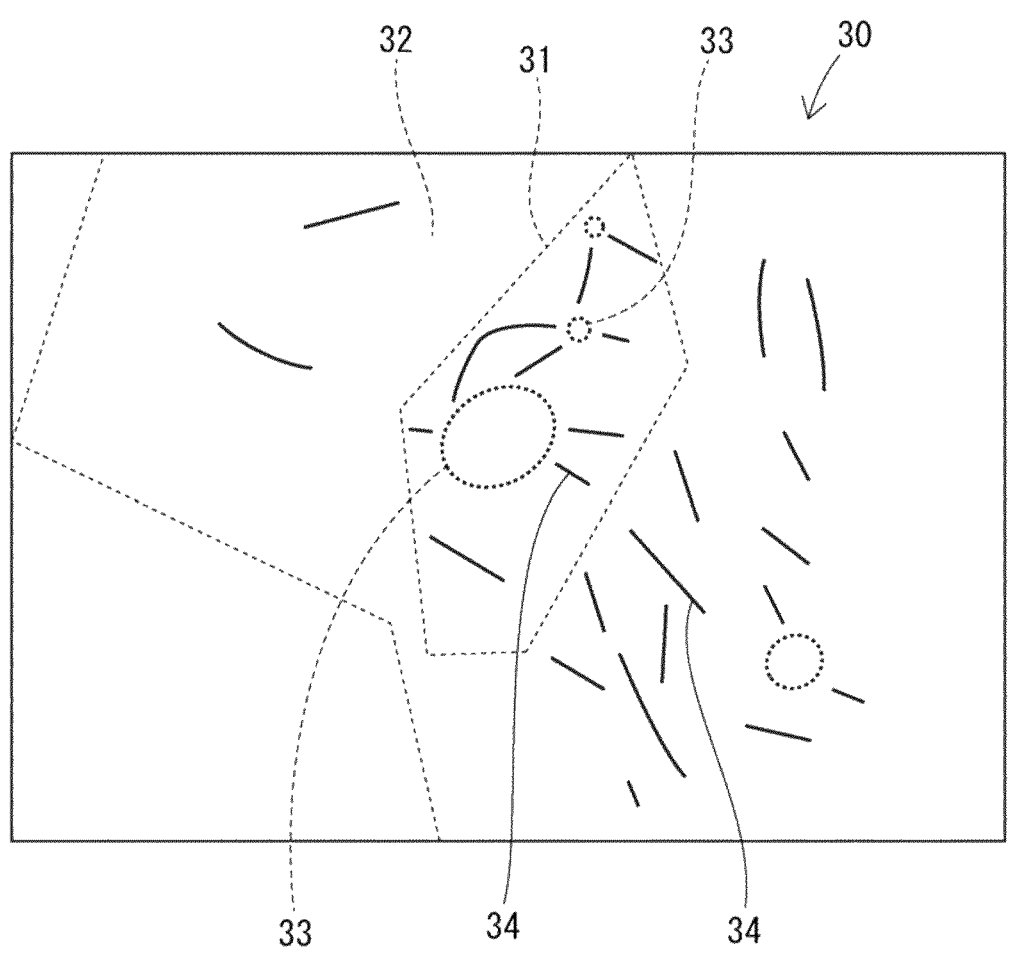
FIG. 4 Diagram schematically illustrating the STEM image of the sintered body.

The internal particle 33 and the dislocations 34 in the core portion 31 and the peripheral portion 32 can be confirmed by observing an STEM image of the sintered body 2 which is obtained by an STEM (scanning transmission electron microscope). This observation is performed in a 15 μm square range on the cross-section of the sintered body 2. For example, in the STEM image of the sintered body 2 in FIG. 3, an image of the internal particle 33 having an almost round shape is observed near the center of the image. In this STEM image, images of the linear dislocations 34 are also observed in the core portion 31 and the peripheral portion 32. Whether or not the internal particle 33 and the dislocation 34 exist can be confirmed by observing presence or absence of such images of the internal particle 33 and the dislocation 34. FIG. 4 is a schematic diagram schematically illustrating the STEM image.

In a case where the core portion 31 has the internal particle 33 containing at least one selected from Co, Ni, Re, and Ru, the dislocations 34 can be left in the core portion 31 and the peripheral portion 32. The dislocations 34 in the core portion 31 and the peripheral portion 32 are considered to have an effect as exhibited by a grain boundary. Therefore, it is inferred that the third hard particles 30 are made spuriously fine, and the third hard particles 30 are hardened as compared with a state where the dislocation 34 is absent, and wear resistance is improved.

Figure 5:
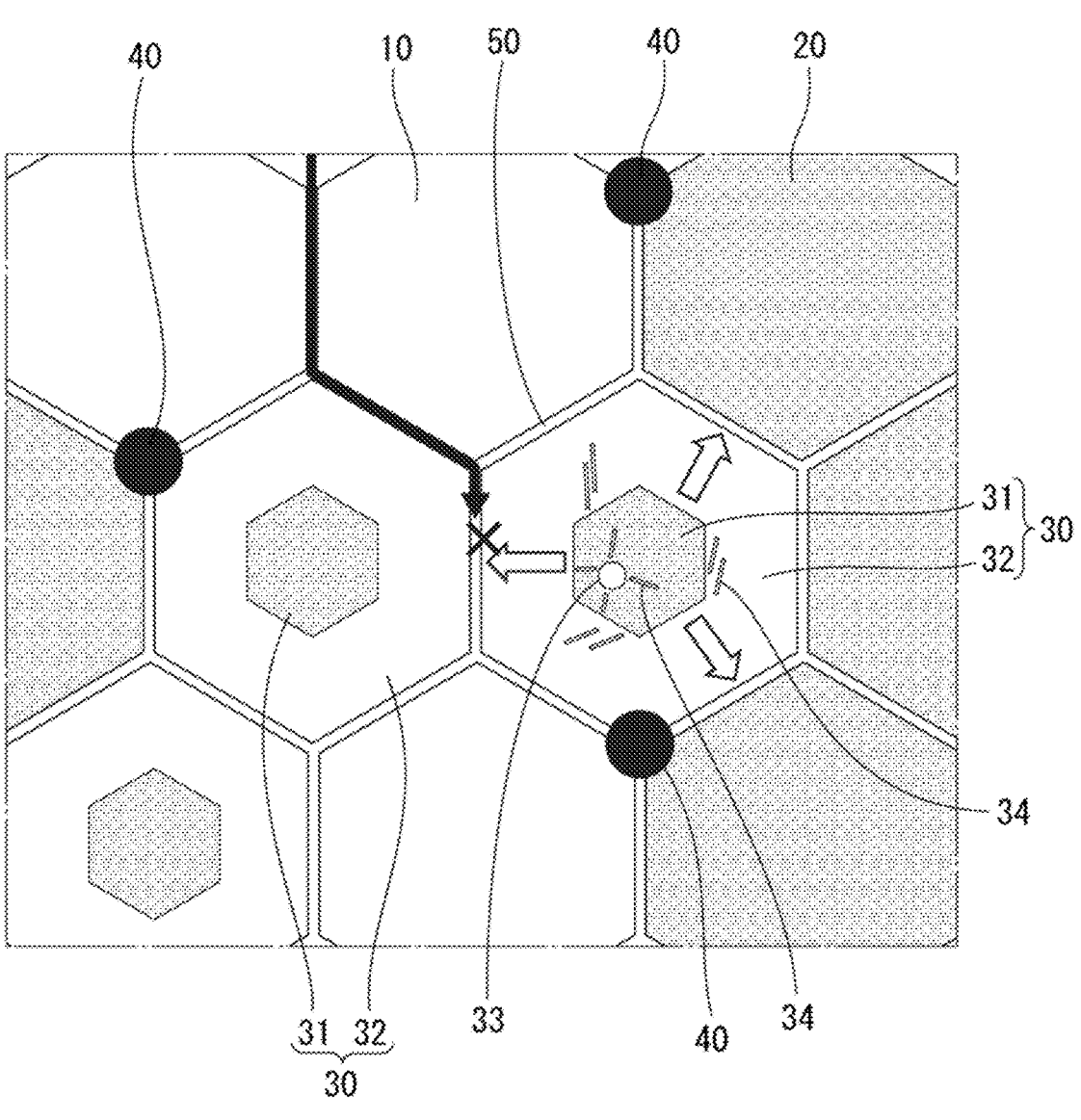
FIG. 5 Diagram for explaining a reason why development of a crack occurring in the sintered body is blocked.

In addition, when the internal particle 33 having a relatively great thermal expansion coefficient is enclosed in the third hard particle 30, compressive stress is left residual in a grain boundary around the third hard particle 30. In FIG. 5, the compressive stress is represented by outline arrows. It is inferred that development of crack is blocked by the effect of the residual stress, so that the sintered body 2 has excellent wear resistance and fracture resistance. In FIG. 5, a crack developing direction is represented by a black arrow, and a state in which the development is blocked is represented by an X mark.

(10) Preferable Requirements for Sintered Body

Preferably, in the sintered body 2, the binding phase 50 further contains Mo (molybdenum).

Mo is a metal having a high melting point. In a case where Mo is further contained in the binding phase 50, high-temperature softening of the binding phase 50 can be further inhibited. Therefore, plastic deformation of the sintered body 2 is less likely to occur. In addition, a part of Mo dissolved in the second hard particles 20 and the third hard particles 30 as a solid solution, and enhances binding strength between the binding phase 50 and the second hard particles 20, and binding strength between the binding phase and the third hard particles 30. Therefore, wear resistance and fracture resistance of the sintered body 2 can be further improved. It can be confirmed through measurement by an EDS that Mo is contained in the binding phase 50.

The content of Mo (molybdenum) in the binding phase 50 is preferably 10 mass % to 30 mass % and more preferably 15 mass % to 25 mass % in a case where the content of the entirety of the binding phase 50 is 100 mass %.

In the sintered body 2, the dispersed particles 40 are preferably AlN particles (aluminium nitride particles). The AlN particles (aluminium nitride particles) allow a cutting tool 1 obtained by using the sintered body 2 to have enhanced thermal conductivity and a reduced thermal expansion coefficient. Therefore, in a case where AlN particles (aluminium nitride particles) are contained as the dispersed particles 40, more excellent wear resistance and fracture resistance can be exhibited in high-speed machining, and the lifespan of the tool is increased.

2. Method for Manufacturing Sintered Body

The method for manufacturing the sintered body 2 is not particularly limited. An example of the method for manufacturing the sintered body 2 will be described below.

(1) Material

As the material, the following material powders are used.

Ti carbonitride-based material powder

Material powders such as TaC powder (tantalum carbide powder), NbC powder (niobium carbide powder), and WC powder (tungsten carbide powder)

Material powders such as AlN powder (aluminium nitride powder), $Al_2O_3$ powder (aluminium oxide powder), $ZrO_2$ powder (zirconium oxide powder), SiC powder (silicon carbide powder), and $Si_3N_4$ powder (silicon nitride powder)

Material powders such as Co powder (cobalt powder), Ni powder (nickel powder), Re powder (rhenium powder), Ru powder (ruthenium powder), and Mo powder (molybdenum powder)

(2) Preparation of Powder for Sintering

The material powders are weighed so as to obtain a predetermined blending ratio. The material powders, ball stones (for example, $Al_2O_3$ ball stones), and a solvent (for example, acetone) are put in a container (for example, resin pot or the like), mixed, and pulverized. The obtained slurry is dried with hot water, to obtain dried mixed powder.

(3) Sintering

The dried mixed powder is press-formed and is thereafter subjected to atmosphere sintering, to produce the sintered body 2. The atmosphere sintering is performed in an Ar or $N_2$ atmosphere.

The dislocations 34 in the third hard particles 30 can be controlled according to a sintering condition (temperature increase rate). The dislocation 34 is generated by enclosing, in the third hard particle 30, the internal particle 33 having a greater thermal expansion coefficient than the third hard particle 30. Therefore, by increasing the mutual solid solution progress speed of the above-described Ti carbonitride-based material, the same component as the binding phase 50 that is taken into the third hard particles 30 is deposited as the internal particle 33, and the dislocation 34 can be generated. In the present embodiment, a residual of the dislocation 34 can be controlled by adjusting the temperature increase rate between 10° C./min and 20° C./min.

In addition, the thickness of the binding phase 50 at a grain boundary between the third hard particles 30 adjacent to each other can be controlled by particle diameters of the first hard particles 10, the second hard particles 20, and the third hard particles 30. Specifically, when the hard particles 10, 20, and 30 are fine, a grain boundary area is increased, the binding phase 50 is thus spread, and the thickness of the binding phase 50 can be reduced. Meanwhile, when the hard particles 10, 20, and 30 are coarse, the grain boundary area is reduced, and the thickness of the binding phase 50 is thus increased.

The particle diameter of each of the hard particles 10, 20, and 30 can be controlled by a sintering temperature and addition of a material (for example, material powder such as AlN powder or $Al_2O_3$ powder) for the dispersed particles 40. Specifically, by performing sintering at a relatively low sintering temperature (for example, not higher than 1800° C.) and inhibiting particle growth by the dispersed particles 40, the thickness of the binding phase 50 can be made not greater than 5 nm.

3. Cutting Tool

Figure 2:
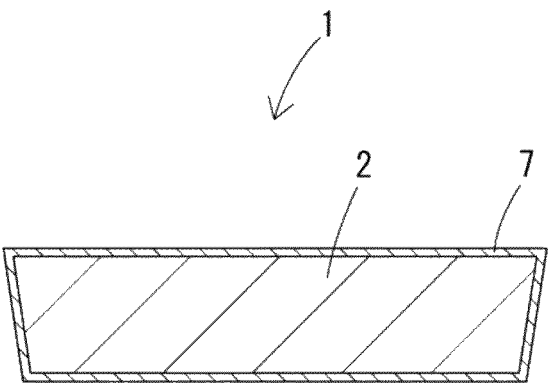
FIG. 2 Cross-sectional view taken along a line A-A in FIG. 1.

As shown in FIG. 1 and FIG. 2, the cutting tool 1 is obtained by using the above-described sintered body 2. The shape of the cutting tool 1 is not particularly limited.

The sintered body 2 can be subjected to shape and surface finishing treatments by at least one of cutting, grinding, and polishing processes, to produce the cutting tool 1. It is needless to say that, if such finishing treatments are unnecessary, the sintered body 2 may be used as it is as the cutting tool 1.

The cutting tool 1 may be produced such that the sintered body 2 is used as a base, and a coating layer 7 is formed on a surface of the base. Although the coating layer 7 is not particularly limited, the coating layer 7 is preferably formed of, for example, at least one compound selected from carbides, nitrides, oxides, carbonitrides, carbonates, oxynitrides, and oxycarbonitrides of each of titanium, zirconium, chromium, and aluminium. By forming the coating layer 7, the surface hardness of the cutting tool 1 is increased, and oxidation of the base covered by the coating layer 7 can be inhibited, so that the cutting tool 1 can have improved wear resistance.

The at least one compound selected from carbides, nitrides, oxides, carbonitrides, carbonates, oxynitrides, and oxycarbonitrides of each of titanium, zirconium, chromium, and aluminium is not particularly limited. However, preferable examples thereof include TiN, TiAlN, TiCrAlN, and CrAlN. From the viewpoint of oxidation resistance and lubricity, a Cr-based compound (for example, TiCrAlN or CrAlN) is more preferable.

The coating layer 7 may be formed as a single layer film, or a laminated film in which a plurality of films are laminated.

The thickness of the coating layer 7 is not particularly limited. The thickness of the coating layer 7 is preferably not less than 0.02 μm and not greater than 30 μm from the viewpoint of wear resistance.

Examples

The present disclosure will be more specifically described below by means of examples.

Experimental examples 1, 3, and 7 to 17 are examples, and Experimental examples 2, and 4 to 6 are comparative examples.

In the tables, the experimental examples are each indicated by using "No". Furthermore, in the tables, the experimental examples having "*" added thereto like "*2", are comparative examples.

1. Experimental Examples 1 to 17

A sintered body according to each of Experimental examples 1 to 17 was produced, and the sintered body was machined, to obtain a cutting tool according to each of Experimental examples 1 to 17.

(1) Material Powder

The following material powders were used.

TiCN powder: average particle diameter of not greater than 1.5 μm

TiN powder: average particle diameter of not greater than 1.5 μm

TaC powder: average particle diameter of not greater than 1.5 μm

NbC powder: average particle diameter of not greater than 1.5 μm

WC powder: average particle diameter of not greater than 1.5 μm $Al_2O_3$ powder: average particle diameter of not greater than 0.7 μm AlN powder: average particle diameter of not greater than 0.7 μm $ZrO_2$ powder: average particle diameter of not greater than 0.7 μm SiC powder: average particle diameter of not greater than 0.7 μm $Si_3N_4$ powder: average particle diameter of not greater than 0.7 μm Co powder: average particle diameter of not greater than 5.0 μm Ni powder: average particle diameter of not greater than 5.0 μm Re powder: average particle diameter of not greater than 5.0 μm Ru powder: average particle diameter of not greater than 5.0 μm Mo powder: average particle diameter of not greater than 5.0 μm (2) Production of Sintered Body (Experimental Examples 1 to 17)

The material powders were used to prepare mixed powder, and acetone was put into the mixed powder, and the obtained mixture was pulverized and mixed for 72 hours. After the pulverizing and mixing, the obtained slurry was dried with hot water to degas acetone, thereby preparing dried mixed powder. The dried mixed powder as thus obtained was used for press-forming, and was thereafter subjected to atmosphere sintering to produce a sintered body. The atmosphere sintering condition was such that the sintering temperature was 1600° C. to 1750° C., a temperature increase rate was ° C./min to 20° C./min, and the atmosphere sintering was performed in an Ar or $N_2$ atmosphere. In a case where densifying was difficult, an HIP process was performed as appropriate. The conditions for the HIP process were 1500° C. to 1700° C., 150 MPa, and an Ar atmosphere. Table 1 indicates a blending composition (vol %), a sintering temperature, and a temperature increase rate in each experimental example.

The dislocations in the third hard particles were controlled by a temperature increase rate. That is, by increasing a mutual solid solution progress speed of the Ti carbonitride-based material, a binding phase component taken into the third hard particles is deposited as the internal particles, and the dislocations is generated. Therefore, by adjusting the temperature increase rate, a sintered body having at least one dislocation in each of the core portion and the peripheral portion was obtained. For example, in Experimental example 1, the temperature increase rate was 10° C./min.

The thickness of the binding phase at a grain boundary between the third hard particles adjacent to each other was controlled by addition of the dispersed particle material, and a sintering temperature. Specifically, the sintering was performed at a relatively low sintering temperature (for example, not higher than 1800° C.) and particle growth was inhibited by the dispersed particles, whereby a sintered body in which the thickness of the binding phase was not greater than 5 nm was obtained. For example, in Experimental example 1, AlN powder was added as the dispersed particle material, and sintering was performed at a sintering temperature of 1650° C.

Insert chip shape: CNGN120408T00520
Workpiece: S45C (JIS)
Cutting speed: 500 m/min
Cut depth: 3.0 mm
Feed rate: 0.4 mm/rev.
Cutting environment: dry turning test

TABLE 1

| | Blending composition (vol %) | | | | | | | | | | | | | | | Manufacturing method | |
| No | TiCN | TiN | TaC | NbC | WC | AlN | Al2O3 | ZrO2 | SiC | Si3N4 | Co | Ni | Re | Ru | Mo | Sintering temperature | Temperature increase rate |
|---|---|---|---|---|---|---|---|---|---|---|---|---|---|---|---|---|---|
| 1 | 32 | 47 | 7 | | | 9 | | | | | 3.5 | | 0.5 | | 1.0 | 1650° C. | 10° C./min |
| *2 | 32 | 47 | 7 | | | 9 | | | | | 3.5 | | 0.5 | | 1.0 | 1650° C. | 5° C./min |
| 3 | 32 | 47 | 7 | | | 9 | | | | | 3.5 | | 0.5 | | 1.0 | 1700° C. | 10° C./min |
| *4 | 32 | 47 | 7 | | | 9 | | | | | 3.5 | | 0.5 | | 1.0 | 1850° C. | 10° C./min |
| *5 | 32 | 47 | 7 | | | 9 | | | | | 3.5 | | | | | 1650° C. | 10° C./min |
| *6 | 35 | 52 | 8 | | | | | | | | 3.5 | | 0.5 | | 1.0 | 1650° C. | 10° C./min |
| 7 | 32 | 47 | | 7 | | 9 | | | | | 3.5 | | 0.5 | | 1.0 | 1650° C. | 10° C./min |
| 8 | 28 | 41 | 3.5 | 3.5 | 10 | 9 | | | | | 3.5 | | 0.5 | | 1.0 | 1650° C. | 10° C./min |
| 9 | 32 | 47 | 7 | | | 9 | | | | | 1.8 | 1.7 | 0.5 | | 1.0 | 1650° C. | 10° C./min |
| 10 | 32 | 47 | 7 | | | 9 | | | | | 1.8 | 1.7 | | 0.5 | 1.0 | 1650° C. | 10° C./min |
| 11 | 32 | 47 | 7 | | | 9 | | | | | 1.8 | 1.7 | 1.5 | | | 1650° C. | 10° C./min |
| 12 | 32 | 47 | 7 | | | | 9 | | | | 3.5 | | 0.5 | | 1.0 | 1650° C. | 10° C./min |
| 13 | 32 | 47 | 7 | | | | | 9 | | | 3.5 | | 0.5 | | 1.0 | 1650° C. | 10° C./min |
| 14 | 32 | 47 | 7 | | | | | | 3 | | 3.5 | | 0.5 | | 1.0 | 1700° C. | 10° C./min |
| 15 | 32 | 47 | 7 | | | | | | | 3 | 3.5 | | 0.5 | | 1.0 | 1700° C. | 10° C./min |
| 16 | 33 | 48 | 7 | | | 9 | | | | | 2.1 | 0.3 | | | 0.6 | 1675° C. | 10° C./min |
| 17 | 31 | 45 | | 7 | | 9 | | | | | 5.6 | 0.8 | | | 1.6 | 1625° C. | 10° C./min |

(3) Presence or Absence of Internal Particle and Presence or Absence of Dislocation in Third Hard Particle For the sintered body obtained as in the above-described manner, the third hard particles in a 15 μm square range were observed by observing the structure by an STEM. Then, presence or absence of the internal particles and presence or absence of the dislocations in the third hard particles were confirmed by the manner described in the embodiment.

In the cells for "internal particle" in Table 2, "presence" indicates that the third hard particle having, in the core portion, a particle containing at least one selected from Co, Ni, Re, and Ru, was observed, and "absence" indicates that such third hard particles were not observed. In the cells for "dislocation" in Table 2, "presence" indicates that the third hard particle having at least one dislocation in each of the core portion and the peripheral portion was observed, and "absence" indicates that such third hard particles were not observed.

(4) Thickness of Binding Phase

For the sintered body obtained as in the above-described manner, the third hard particles in a 15 μm square range were observed by observing the structure by an STEM. The thickness (nm) was measured at a portion at which the thickness of the binding phase was smallest at a grain boundary between the third hard particles adjacent to each other. The measurement results are indicated in cells for "thickness of binding phase" in Table 2.

(5) Production of Cutting Tool

The sintered body of each of Experimental examples 1 to 17 was polished so as to have a predetermined size, to produce a cutting tool.

(6) Test for Evaluating Wear Resistance Against Carbon Steel (6.1) Test Conditions A cutting test was performed by using each cutting tool. The test conditions were as follows.

(6.2) Evaluation

Evaluation was performed by using the following events as lifespan criteria according to a cutting distance until the end of the life. In a case where the cutting distance was not less than 1 km, the case was determined as being acceptable. Having the long lifespan is one index of excellent wear resistance and fracture resistance.

Lifespan Criterion

The cutting distance at which "fracture" or "plastic deformation" occurred was determined as lifespan (km).

In a case where deformation of a cutting edge relative to a flank surface as a reference surface was greater than 0.01 mm, "plastic deformation" was determined to have occurred.

(7) Evaluation Result

Table 2 indicates evaluation results.

TABLE 2

| | Third hard particle | | Thickness | Cutting test result | |
| No | Internal particle | Dislocation | of binding phase | Lifespan (km) | Cause of end of life |
|---|---|---|---|---|---|
| 1 | present | present | 2 nm | 3.0 | fracture |
| *2 | absent | absent | 3 nm | 0.5 | fracture |
| 3 | present | present | 5 nm | 2.2 | fracture |
| *4 | present | present | 8 nm | 0.8 | plastic deformation |
| *5 | present | present | 2 nm | 0.3 | plastic deformation |
| *6 | present | present | 7 nm | 0.4 | fracture |
| 7 | present | present | 4 nm | 2.7 | fracture |
| 8 | present | present | 2 nm | 2.0 | fracture |
| 9 | present | present | 2 nm | 1.8 | fracture |
| 10 | present | present | 2 nm | 1.6 | fracture |
| 11 | present | present | 2 nm | 1.3 | fracture |
| 12 | present | present | 3 nm | 1.5 | fracture |

TABLE 2-continued

| | | | | Cutting test result | |
| | Third hard particle | | Thickness | | Cause of |
| No | Internal particle | Dislocation | of binding phase | Lifespan (km) | end of life |
| --- | --- | --- | --- | --- | --- |
| 13 | present | present | 2 nm | 1.6 | fracture |
| 14 | present | present | 4 nm | 1.4 | fracture |
| 15 | present | present | 4 nm | 1.4 | fracture |
| 16 | present | present | 2 nm | 1.9 | fracture |
| 17 | present | present | 4 nm | 2.6 | fracture |

(7.1) Regarding Presence or Absence of Internal Particle and Presence or Absence of Dislocation in Third Hard Particle Experimental examples 1 to 3 were compared for review. In Experimental example 2 in which the internal particle was absent and the dislocation in the third hard particle was absent, the lifespan was 0.5 km and was not acceptable. In Experimental example 1 in which the internal particle was present and the dislocation in the third hard particle was present, the lifespan was 3.0 km and was acceptable. In Experimental example 3 in which the internal particle was present and the dislocation in the third hard particle was present, the lifespan was 2.2 km and was acceptable. In other words, fracture resistance was inferior in Experimental example 2 in which the requirements for the third hard particle were not satisfied, whereas fracture resistance was improved in each of Experimental examples 1 and 3 in which the requirements for the third hard particle were satisfied.

(7.2) Regarding Thickness of Binding Phase

Experimental examples 1, 3, and 4 were compared for review. In Experimental example 4 in which the thickness of the binding phase was 8 nm and was greater than 5 nm, the lifespan was 0.8 km and was not acceptable. In Experimental example 1 in which the thickness of the binding phase was 2 nm and was not greater than 5 nm, the lifespan was 3.0 km and was acceptable. In Experimental example 3 in which the thickness of the binding phase was 5 nm and was not greater than 5 nm, the lifespan was 2.2 km and was acceptable. Resistance to plastic deformation was inferior in Experimental example 4, whereas resistance to plastic deformation was improved in Experimental examples 1 and 3.

(7.3) Regarding Blending of Re or Ru Material

Experimental examples 1, 3, and 5 were compared for review. In Experimental example 5 in which the Re or Ru material was not blended, the lifespan was 0.3 km and was not acceptable. In Experimental example 1 in which the Re material was blended, the lifespan was 3.0 km and was acceptable. In Experimental example 3 in which the Re material was blended, the lifespan was 2.2 km and was acceptable. Resistance to plastic deformation was inferior in Experimental example 5, whereas resistance to plastic deformation was improved in Experimental examples 1 and 3. It is inferred that, in Experimental example 5, degradation of resistance to plastic deformation was caused due to degradation of heat resistance of the binding phase.

(7.4) Regarding Presence or Absence of Dispersed Particles

Experimental examples 1, 3, and 6 were compared for review. In Experimental example 6 in which the dispersed particles were not contained, the lifespan was 0.4 km and was not acceptable. In Experimental example 1 in which the dispersed particles were contained, the lifespan was 3.0 km and was acceptable. In Experimental example 3 in which the dispersed particles were contained, the lifespan was 2.2 km and was acceptable. Fracture resistance was inferior in Experimental example 6, whereas fracture resistance was improved in Experimental examples 1 and 3. Furthermore, it was found that fracture resistance in Experimental example 6 was inferior to that in Experimental example 4 in which the thickness of the binding phase was similar to that in Experimental example 6. From this, it is inferred that, in Experimental example 6, a short lifespan was caused by degradation of fracture resistance due to coursing of the first to the third hard particles.

(7.5) Regarding Components of Second Hard Particles and Third Hard Particles

The test results of Experimental examples 7 and 8 indicate that an element (excluding Ti element) belonging to group 4 to group 6 in the periodic table except for Ta may be used as a carbonitride component for the second hard particles and the third hard particles.

(7.6) Regarding Component of Binding Phase

Test results of Experimental examples 9 and 10 indicate that Ru or Ni may be used as a component of the binding phase.

The test result of Experimental example 11 indicates that Mo may not necessarily be contained in a component of the binding phase. However, comparison between Experimental example 11 in which Mo was not contained and Experimental example 1 in which Mo was contained indicates that Experimental example 1 was superior in fracture resistance. Therefore, Mo is preferably contained since the lifespan can be increased.

In each of a case where a kind of the dispersed particles was AlN (Experimental example 1) and a case where a kind of the dispersed particles was $Al_2O_3$ (Experimental example 17), wear resistance and fracture resistance were confirmed to be excellent. However, comparison between Experimental example 11 in which a kind of the dispersed particles was AlN, and Experimental example 17 in which a kind of the dispersed particles was $Al_2O_3$ indicates that Experimental example 1 was superior in fracture resistance. Thus, particularly in a case where AlN was used, wear resistance was improved by enhanced thermal conductivity and improved resistance to reaction with iron in the sintered body, and in addition, fracture resistance was significantly improved by reduction of a thermal expansion coefficient. This suggested that AlN was more preferable.

(7.7) Regarding Component of Dispersed Particles

Comparison among Experimental examples 11 to 15 indicates that particles other than AlN and $Al_2O_3$ particles may be used as the dispersed particles. Specifically, it is indicated that $ZrO_2$, SiC, and $Si_3N_4$ particles may be used.

(7.8) Regarding an Amount of Binding Phase Component

Comparison among Experimental examples 1, 3, 7 to 12 and Experimental examples 16 and 17 indicates that performance of the tool was sufficient even if an amount of the binding phase component was changed.

In Experimental example 16, the total blended amount of the binding phase components was 3.0 vol %. In Experimental example 17, the total blended amount of the binding phase components was 8.0 vol %. It was suggested that the blended amount of the binding phase components was preferably 3.0 vol % to 8.0 vol % from the viewpoint of obtaining a tool having a long lifespan.

In Experimental examples 1, 3, and 7 to 17, the sintered body and the cutting tool had excellent wear resistance and fracture resistance in high-speed machining. Such a cutting tool allows a cutting speed for machining a steel material to be increased, and allows efficiency for a cutting process to be enhanced.

The present disclosure is not limited to the embodiment described above in detail, and various modifications or variations can be made without departing from the scope of the claims of the present disclosure.

DESCRIPTION OF REFERENCE NUMERALS

1: cutting tool
2: sintered body
7: coating layer
10: first hard particle
20: second hard particle
30: third hard particle
31: core portion
32: peripheral portion
33: internal particle (particle containing at least one selected from Co, Ni, Re, and Ru)
34: dislocation
40: dispersed particle (particle containing at least one of Al, Zr, and Si)
50: binding phase

The invention claimed is:

1. A sintered body comprising:

a first hard particle containing TiCN as a main component;

a second hard particle containing, as a main component, Ti, M, C, and N, wherein M represents one or more elements selected from group 4 to group 6 elements (excluding Ti element) in a periodic table;

a third hard particle including a core portion containing TiCN as a main component, and a peripheral portion enclosing the core portion and containing, as a main component, Ti, M, C, and N, wherein M represents one or more elements selected from group 4 to group 6 elements (excluding Ti element) in the periodic table;

a particle containing at least one of AlN, $Al_2O_3$, $ZrO_2$, SiC, and $Si_3N_4$ as a main component; and a binding phase containing at least one of Co and Ni, wherein the binding phase further contains at least one of Re and Ru, and has a thickness of not greater than 5 nm at at least a part of a grain boundary between the third hard particles adjacent to each other, and at least one of the third hard particles has, in the core portion, a particle containing at least one selected from Co, Ni, Re, and Ru, and has at least one dislocation in each of the core portion and the peripheral portion.

2. The sintered body according to claim 1, wherein the binding phase further contains Mo.

3. A cutting tool comprising the sintered body according to claim 1.

4. The cutting tool according to claim 3, comprising a coating layer on a surface.

5. The sintered body according to claim 1, wherein M is selected from the group consisting of Ta, Nb, W, V, Cr, Zr, Mo, and Hf.

6. The sintered body according to claim 1, wherein M is selected from the group consisting of Ta, Nb, and W.

* * * * *